US007658629B2

(12) United States Patent
Stagi et al.

(10) Patent No.: US 7,658,629 B2
(45) Date of Patent: Feb. 9, 2010

(54) CABLE CONNECTION ASSEMBLY

(75) Inventors: William R. Stagi, Burien, WA (US); James Steele, Seattle, WA (US)

(73) Assignee: UTILX Corporation, Kent, WA (US)

( * ) Notice: Subject to any disclaimer, the term of this patent is extended or adjusted under 35 U.S.C. 154(b) by 0 days.

(21) Appl. No.: 12/050,069

(22) Filed: Mar. 17, 2008

(65) Prior Publication Data

US 2008/0156508 A1   Jul. 3, 2008

Related U.S. Application Data

(63) Continuation of application No. 11/210,254, filed on Aug. 23, 2005, now Pat. No. 7,344,396.

(51) Int. Cl.
*H01R 4/64* (2006.01)
(52) U.S. Cl. ..................................... 439/204
(58) Field of Classification Search ................ 439/201, 439/199, 138
See application file for complete search history.

(56) References Cited

U.S. PATENT DOCUMENTS

| 2,825,039 | A |   | 2/1958  | Schurman |
|-----------|---|---|---------|----------|
| 3,444,507 | A | * | 5/1969  | Gerhard ....................... 439/201 |
| 3,508,188 | A |   | 4/1970  | Buck |
| 3,633,155 | A |   | 1/1972  | Taylor |
| 3,845,450 | A |   | 10/1974 | Cole |
| 4,003,620 | A |   | 1/1977  | O'Brien |
| 4,192,569 | A |   | 3/1980  | Mucci |
| 4,696,540 | A | * | 9/1987  | Adams et al. ................. 385/66 |
| 4,752,252 | A |   | 6/1988  | Cherry |
| 4,927,386 | A | * | 5/1990  | Neuroth ....................... 439/589 |
| 5,035,660 | A |   | 7/1991  | Werner |
| 5,051,103 | A |   | 9/1991  | Neuroth |
| 5,573,423 | A |   | 11/1996 | Lin |
| 5,645,438 | A | * | 7/1997  | Cairns ......................... 439/139 |
| 5,722,842 | A | * | 3/1998  | Cairns ......................... 439/139 |
| 5,738,535 | A | * | 4/1998  | Cairns ......................... 439/138 |
| 5,907,128 | A |   | 5/1999  | Lanan |
| 5,934,937 | A |   | 8/1999  | McCarthy |
| 6,227,866 | B1 | * | 5/2001  | Williams et al. .............. 439/25 |
| 6,332,787 | B1 | * | 12/2001 | Barlow et al. ............... 439/138 |
| 6,364,677 | B1 |   | 4/2002  | Nysveen |
| 6,511,335 | B1 |   | 1/2003  | Rayssiguier |

(Continued)

OTHER PUBLICATIONS

Office Action mailed Dec. 11, 2008, from U.S. Appl. No. 12/028,709, filed Feb. 8, 2008, which is a divisional of the present application.

(Continued)

*Primary Examiner*—Gary F. Paumen
(74) *Attorney, Agent, or Firm*—Christensen O'Connor Johnson Kindness PLLC

(57) ABSTRACT

A cable connection assembly for coupling a cable to an apparatus. The cable connection assembly may include a main body defining an inner cavity adapted to receive a pressurized fluid and receive at least a portion of the cable. The cable connection assembly may also include an attachment mechanism adapted to couple the main body to the cable and a seal assembly adapted to sealingly couple the main body to the apparatus. The cable connection assembly may also include an inlet port passing through the main body for permitting the pressurized fluid to be injected into the inner cavity.

18 Claims, 7 Drawing Sheets

U.S. PATENT DOCUMENTS

| | | | |
|---|---|---|---|
| 6,736,545 B2 * | 5/2004 | Cairns et al. | 385/56 |
| 6,848,934 B1 | 2/2005 | McCarthy | |
| 7,014,513 B2 | 3/2006 | Tomasino | |
| 7,195,504 B2 * | 3/2007 | Bertini et al. | 439/201 |
| 7,344,396 B2 * | 3/2008 | Stagi et al. | 439/204 |
| 2003/0228783 A1 | 12/2003 | Cairns | |
| 2005/0189130 A1 | 9/2005 | Bertini | |

OTHER PUBLICATIONS

Office Action mailed Jan. 19, 2007, from U.S. Appl. No. 11/210,254, filed Aug. 23, 2005, which is the parent of the present application.

Taiwanese Search Report mailed Jun. 8, 2009, issued in corresponding Taiwanese Application No. 95114878, filed Apr. 26, 2006.

* cited by examiner

CABLE CONNECTION ASSEMBLY

CROSS-REFERENCE TO RELATED APPLICATION

This application is a continuation of prior U.S. patent application Ser. No. 11/210,254, filed Aug. 23, 2005 now U.S. Pat. No. 7,344,396, entitled CABLE CONNECTION ASSEMBLY, the disclosure of which is hereby expressly incorporated by reference.

FIELD OF THE INVENTION

The illustrated embodiments of the present invention generally relate to cable connection assemblies, and more specifically, to cable connection assemblies for connecting a cable to an apparatus while permitting a fluid to be injected into the cable.

BACKGROUND OF THE INVENTION

Typical cables include a conductor, such as a number of copper or aluminum strands, surrounded by an insulation layer. In some instances, the life span of a cable is shortened when water enters the cable and forms micro-voids in the insulation layer. These micro-voids spread throughout the insulation layer in a tree like shape, collections of which are sometimes referred to as water trees.

Water trees are known to form in the insulation layer of electrical cables when voltage is applied to the cable in the presence of water and ions. As water trees grow, they compromise the dielectric properties of the insulation layer until failure occurs. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of a dielectric enhancement fluid into interstices located between the strands of the cables. However, injecting the dielectric enhancement fluid into the cable is difficult, especially if the cable is to remain in service during treatment. Accordingly, there exists a need for a device which permits a cable to be injected with restorative fluids, such as dielectric enhancement fluids, while permitting the cable to remain in use.

SUMMARY OF THE INVENTION

One embodiment of a cable connection assembly formed in accordance with the present invention for coupling a cable to an apparatus is disclosed. The cable connection assembly includes a main body defining an inner cavity adapted to receive a pressurized fluid and receive at least a portion of the cable therein. The cable connection assembly also includes an attachment mechanism adapted to couple the main body to the cable and a seal assembly adapted to sealingly couple the main body to the apparatus. The cable connection assembly also includes an inlet port passing through the main body for permitting the pressurized fluid to be injected into the inner cavity.

An alternate embodiment of a cable connection assembly formed in accordance with the present invention for coupling a cable to an apparatus is disclosed. The cable connection assembly includes a main body defining an inner cavity adapted to receive a pressurized fluid and receive at least a portion of the cable therein and a threaded portion disposed on a first end of the main body for coupling the main body to the cable. The cable connection assembly also includes a seal disposed on the second end of the main body for sealing the main body to the apparatus and an inlet port. The inlet port passes through the main body for permitting the pressurized fluid to be injected into the inner cavity of the main body. The cable connection assembly further includes a fastening mechanism disposed on a second end of the main body for coupling the main body to the apparatus.

Still another alternate embodiment of a cable connection assembly formed in accordance with the present invention for coupling a cable to an apparatus is disclosed. The cable connection assembly includes a main body defining an inner cavity adapted to receive a pressurized fluid and receive at least a portion of the cable. The cable connection assembly also includes a coupling assembly for coupling a first end of the main body to the cable and a seal assembly for sealing a second end of the main body to the apparatus. The cable connection assembly further includes an inlet port passing through the main body for permitting the pressurized fluid to be injected into the inner cavity of the main body and a sealing member. The sealing member is coupled to the main body. The sealing member is moveable between a closed position in which the sealing member impedes fluid from flowing through the inlet port and an open position in which the sealing member permits fluid to flow through the inlet port for receipt by the cable.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
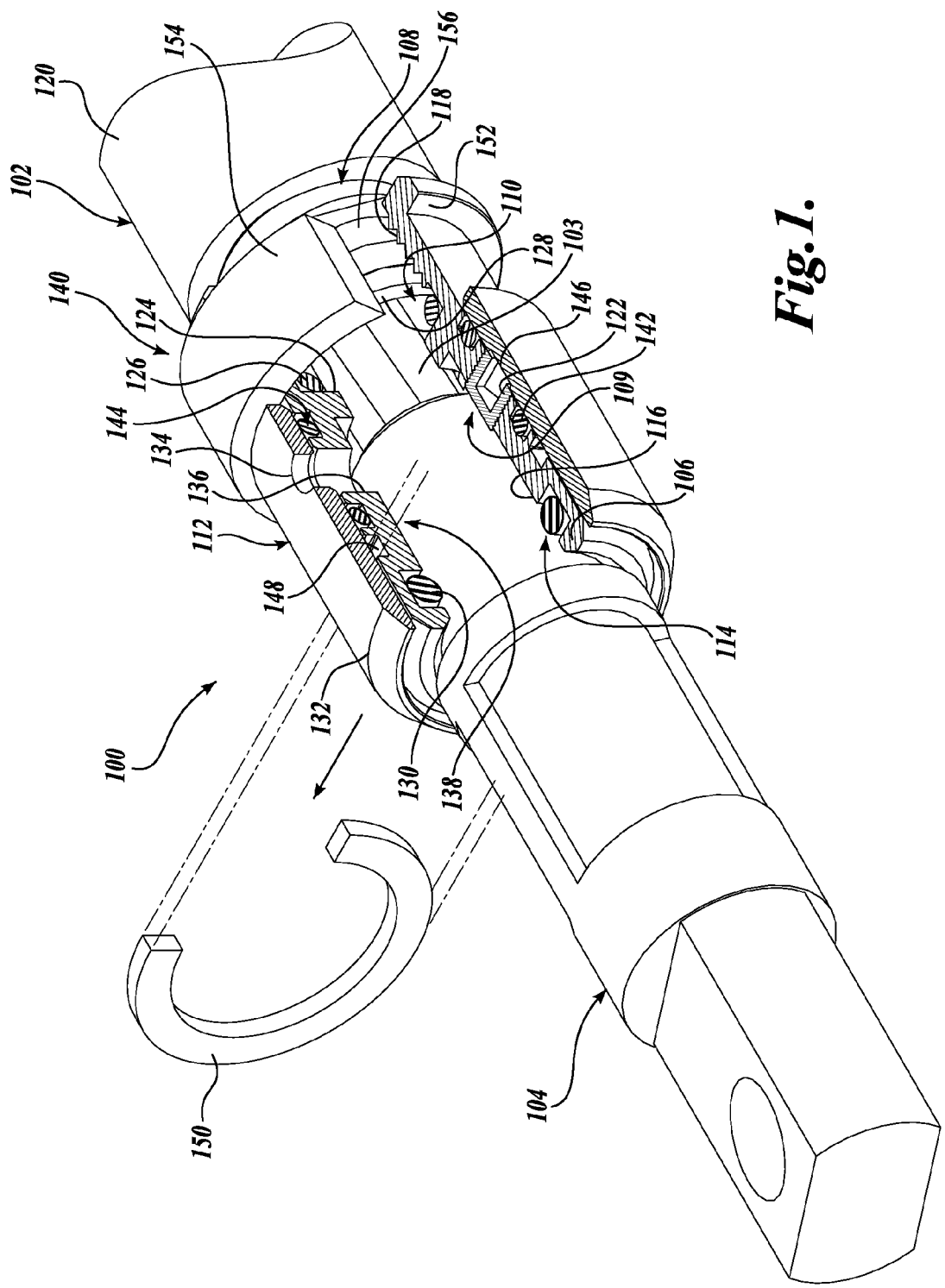
FIG. 1 is a perspective, partial cut-away view of one embodiment of a cable connection assembly formed in accordance with the present invention, the cable connection assembly shown with a valve assembly of the cable connection assembly in an open position permitting fluid to enter the cable connection assembly through the valve assembly.
Figure 2:
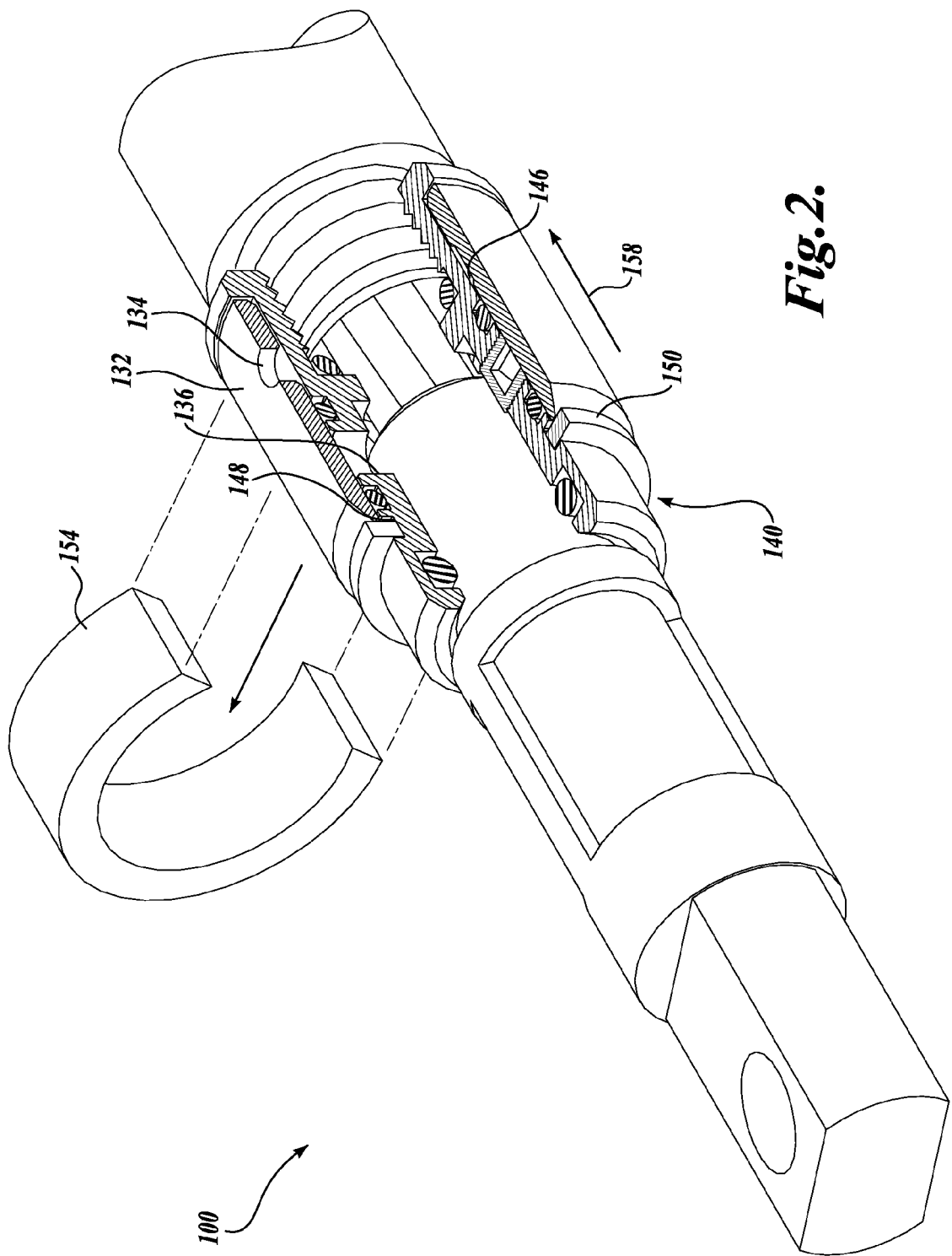
FIG. 2 is a perspective, partial cut-away view of the cable connection assembly of FIG. 1, the cable connection assembly illustrated with the valve assembly in a closed position blocking fluid from exiting and/or entering the cable connection assembly through the valve assembly.
Figure 3:
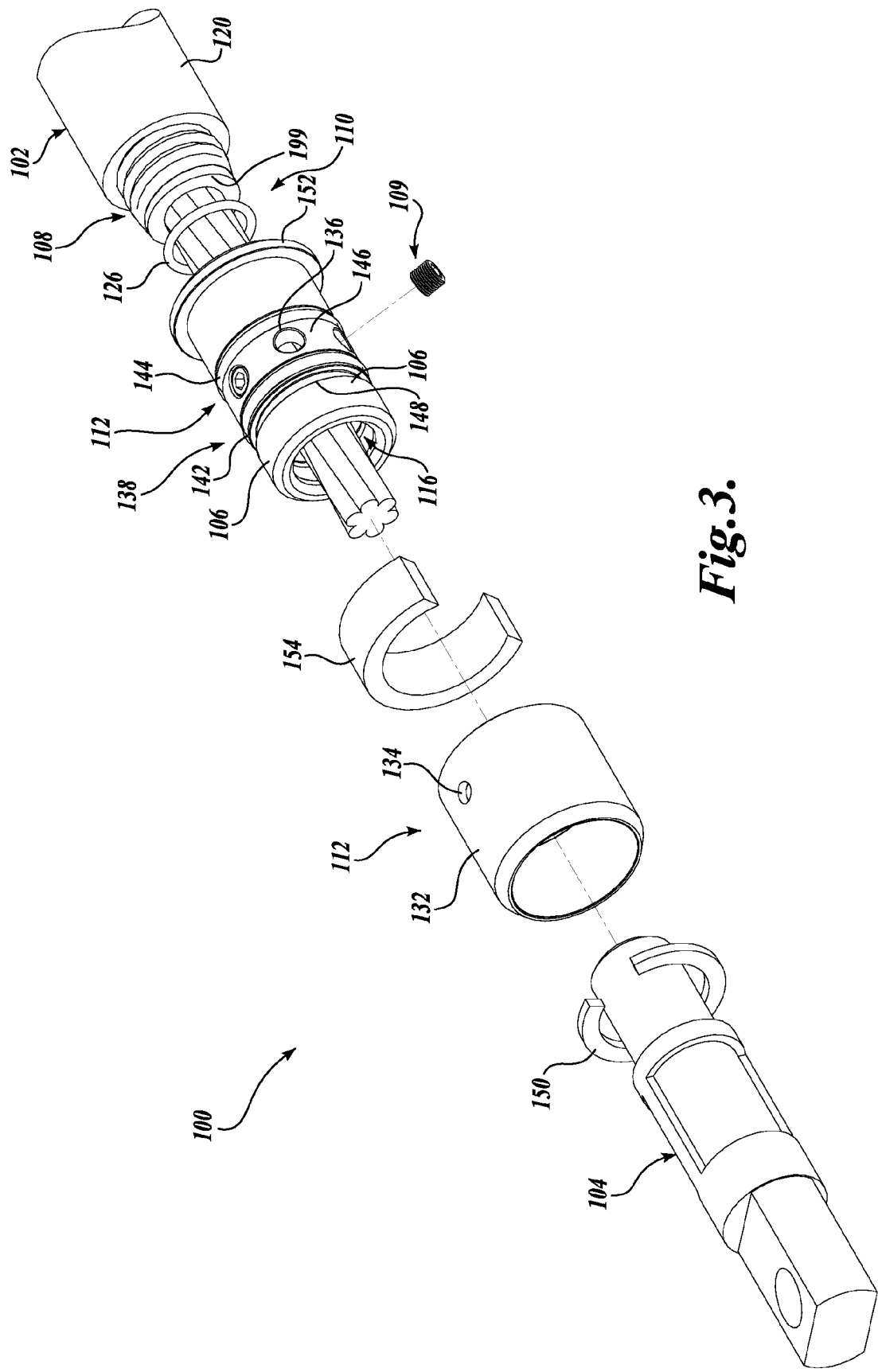
FIG. 3, is a perspective, exploded view of the cable connection assembly of FIG. 1.

Referring to FIGS. 1-3, one embodiment of a cable connection assembly 100 formed in accordance with the present invention is shown. Generally described, the cable connection assembly 100 is adapted to couple a cable 102 to an apparatus 104 while permitting a fluid, one suitable example being a restorative fluid, such as a dielectric enhancement fluid, to be injected into the cable 102. The cable 102 may be any well known or to be developed cable, such as the cable 102 illustrated, having a plurality of conductors 103 surrounded by an insulation layer 120. The apparatus 104 may be any well known or to be developed component requiring connection to the cable 102, a few suitable examples being a termination connector, such as shown, for connecting the cable 102 to a device requiring to be in electrical communication with the cable 102, such as a junction box, transformer, etc.

Referring to FIGS. 1 and 3, the cable connection assembly 100 includes a main body 106, an attachment mechanism 108, a fastening mechanism 109, a cable seal mechanism 110, a valve assembly 112, and an apparatus seal assembly 114. The main body 106 is suitably a cylindrically shaped structure, such as a collar, defining an inner cavity 116. The inner cavity 116 may be sized and shaped to receive at least a portion of the cable 102 and at least a portion of the apparatus 104. Further, the inner cavity 116 is adapted to receive the fluid mentioned above for treating the cable 102.

The attachment mechanism 108 removably attaches a first end of the main body 106 to the cable 102. In the illustrated embodiment, the attachment mechanism 108 includes a threaded portion 118 to engage corresponding threads 156 disposed on an insulation layer 120 of the cable 102. Although the attachment mechanism 108 is illustrated and described as utilizing threads to couple the cable connection assembly 100 to the cable 102, the attachment mechanism 108 may use various other means for coupling the cable connection assembly 100 to the cable 102, a few suitable examples being mechanical fasteners, self tapping threads, push on style barbed fittings, ferrule style connectors, quick-to-connect devices, and crimping devices that are capable of holding cable 102 in contact with main body 106.

The fastening mechanism 109 removably attaches a second end of the main body 106 to the apparatus 104. The fastening mechanism 109 includes one or more fasteners 122, such as set screws, which pass radially through the main body 106. The fasteners 122 engage the apparatus 104, thereby mechanically and electrically coupling or locking the apparatus 104 to the main body 106. It should be apparent to one of ordinary skill that other types of fastening mechanisms 109, such as threads disposed on the main body 106, adhesives, quick-to-connect devices, crimping devices, self-locking retaining rings, welding, and chemical adhesives, are also within the scope of the present invention.

The cable seal mechanism 110 is adapted to seal the main body 106 to the cable 102. The cable seal mechanism 110 includes a sealing surface 124 (FIG. 1) disposed on the main body 106 and a seal 126. The sealing surface 124 is an annularly shaped surface formed in the main body 106 and is adapted to sandwich the seal 126 against an end face 199 of the cable 102, thereby creating an end seal between the sealing surface 124 and the end face 199. Further, because of the threaded engagement between the cable 102 and the main body 106, the resulting attachment is more secure than existing designs.

Specifically, the end seal between the sealing surface 124 and the end face 199 is maintained during dynamic changes, such as thermal changes, in the insulation layer 120. Because the main body 106 is threadably connected to the insulation layer 120, any changes or movement of the insulation layer results in a corresponding movement of the main body 106. This maintains a secure end seal between the sealing surface 124 and the end face 199.

The apparatus seal assembly 114 is adapted to seal the main body 106 to the apparatus 104. The apparatus seal assembly 114 includes an annular shaped sealing recess 132 or groove formed on the inner surface of the main body 106 and a seal 130. The sealing recess 132 is adapted to at least partially receive the seal 130 and sandwich the seal against the apparatus 104 to seal the main body 106 to the apparatus 104. It should be apparent that the main body 106 may be sealed to the apparatus 104 in any number of ways, including gaskets, a seal disposed against an endface of the apparatus 104, threading of the main body 106 upon the apparatus, liquid gasket compounds, etc.

The valve assembly 112 includes a sealing member 132, an injection port 134, an inlet port 136, a valve seal assembly 138, and a locking assembly 140. The sealing member 132 of the illustrated embodiment is in the form of a sleeve which may be linearly moved in the direction of the longitudinal length of the cable connection assembly 100 as indicated by arrow 158 in FIG. 2. The sealing member 132 is adapted to slidingly receive the main body 106 within an inner passageway defined by the sealing member 132. The sealing member 132 includes the injection port 134. The injection port 134 is adapted to interface with a fluid injection source to permit a fluid to pass through the sealing member 132 and into the inner cavity 116 of the main body 106.

The valve assembly 112 may include one or more inlet ports 136. The inlet ports 136 may pass through the main body 106 for permitting a fluid to pass through the main body 106 and into the inner cavity 116. The inlet ports 136 may pass through the main body 106 in a radial direction. In the illustrated embodiment, there are multiple inlet ports 136 spaced equidistant about the circumference of the main body 106. Although multiple inlet ports 136 are illustrated and described, it should be noted that a single inlet port 136 is also suitable for use with the present invention.

Returning the focus to the sealing member 132, as noted above, the sealing member 132 is moveable relative to the main body 106. The sealing member 132 may be linearly moved between at least a closed position and an open position. In the open position shown in FIG. 1, the injection port 134 associated with the sealing member 132 is selectively positioned such that the fluid may flow through the injection port 134, through the inlet ports 136, and into the inner cavity 116. In the closed position shown in FIG. 2, the injection port 134 associated with the sealing member 132 is aligned such that the injection port 134 is no longer in fluid communication with the inlet ports 136. Thus, in the closed position, fluid is impeded from flowing through the injection port 134 and into the inner cavity 116 via the inlet ports 136.

The valve assembly 112 may further include a valve seal assembly 138. In the illustrated embodiment, the valve seal assembly 138 includes a pair of seals 142 and 144 disposed on each side of the inlet ports 136. The seals 142 and 144 may be annular in shape and may circumferentially engage both the sealing member 132 and the main body 106, sealing the sealing member 132 to the main body 106. The seals 142 and 144 help define a fluid passageway 146 defined by the space between the seals 142 and 144, an inner surface of the sealing member 132, and an outer surface of the main body 106. As best shown in FIG. 2, the sealing member 132 may have a channel disposed on the inner surface of the sealing member 132 to increase the cross-sectional area of the fluid passageway 146. When a fluid is injected in the injection port 134, the fluid may pass circumferentially along the annular shaped fluid passageway 146 and enter the inner cavity 116 through the inlet ports 136.

The locking assembly 140 may be used to lock the sealing member 132 of the valve assembly 112 in either the open position or the closed position. For instance, the locking assembly 140 may include a locking channel 148 disposed circumferentially about the outer surface of the main body 106. The locking channel 148 is sized and shape to receive a locking member 150, a few suitable examples being a snap ring or clip. The locking member 150 is sized and shaped to extend radially outward of the locking channel 148 so as to block movement of the sealing member 132 from the closed position depicted in FIG. 2, to the open position shown in FIG. 1. To transition the sealing member 132 from the closed position to the open position, the locking member 150 is simply removed from the locking channel 148 as shown in FIG. 1, permitting the sealing member 132 to slide past the locking channel 148.

The locking assembly 140 may include a locking flange 152. The locking flange 152 may extend radially outward of the outer surface of the main body 106. The locking flange 152 may be sized and shaped to be a limit stop for a locking member 154, a few suitable examples being a wide snap ring or wide clip. The locking member 154 is sized and shaped to abut the locking flange 152 and the sealing member 132 when the sealing member 132 is in the open position as shown in FIG. 1. When the locking member 154 is in place, the sealing member 132 is impeded from moving back towards the locking flange 152 to the closed position depicted in FIG. 2. To transition the sealing member 132 from the open position to the closed position, the locking member 154 is simply removed as shown in FIG. 2, permitting the sealing member 132 to slide toward the locking flange 152.

Although the locking flange 152 is illustrated and described as being used in locking the sealing member 132 in the open position, and the locking channel 148 used in locking the sealing member 132 in the closed position, it should be noted that in other embodiments, a locking flange may be used in locking the sealing member 132 in the closed position, and a locking channel may be used to lock the sealing member 132 in the open position. Further, it should also be noted, although the locking assembly 140 is shown and illustrated with specific structures for locking the sealing member 132 in either the open position or the closed position, other structures may be used to hold the sealing member 132 in either the open or closed position, a few suitable examples being ball and detent systems, twist-to-lock structures, bayonet style locking mechanisms, fasteners, etc.

In light of the above description of the components of the cable connection assembly 100, the operation of the cable connection assembly 100 will now be described. Referring to FIG. 1, prior to installation, the insulation layer 120 of the cable 102 may be cut back exposing the conductors 103. The insulation layer 120 may then be threaded to form external threads 156 sized and shaped to interface with the threaded portion 118 of the main body 106. The main body 106 is then threaded onto the cable 106. The seal 126 is sandwiched between the sealing surface 124 and the endface 199 providing a fluid seal therebetween, in addition to the seal caused by the interfacing of threads 156 of the insulation layer 120 with the threaded portion 118 of the main body 106.

The distal end of the apparatus 104 may then be slid within the inner cavity 116 of the main body 106 with the conductors 103 of the cable 102 extending within the apparatus 104. The apparatus 104 may then be crimped upon the conductors 103 to retain the apparatus 104 to the cable 102. Seal 130 seals the main body 106 to the apparatus 104. Fasteners 122 are then driven to engage the apparatus 104 to mechanically couple the cable connection assembly 100 to the apparatus 104. Locking member 154 is placed in position to retain the sealing member 132 in the open position. A restorative fluid is injected through the injection port 134 to pass through the fluid passageway 146 and enter the inner cavity 116 through one or more of the inlet ports 136.

Referring to FIG. 2, the sealing member 132 may be placed in the closed position by removing the locking member 154 and sliding the sealing member 132 in the direction of arrow 158. Locking member 150 may then be inserted in locking channel 148 to retain the sealing member 132 in the closed position. When the sealing member 132 is in the closed position, the injection port 134 is out of alignment with the fluid passageway 146, and the inner cavity 116 is now a sealed pressure vessel able to hold a fluid under pressure within the cavity.

Figure 4:
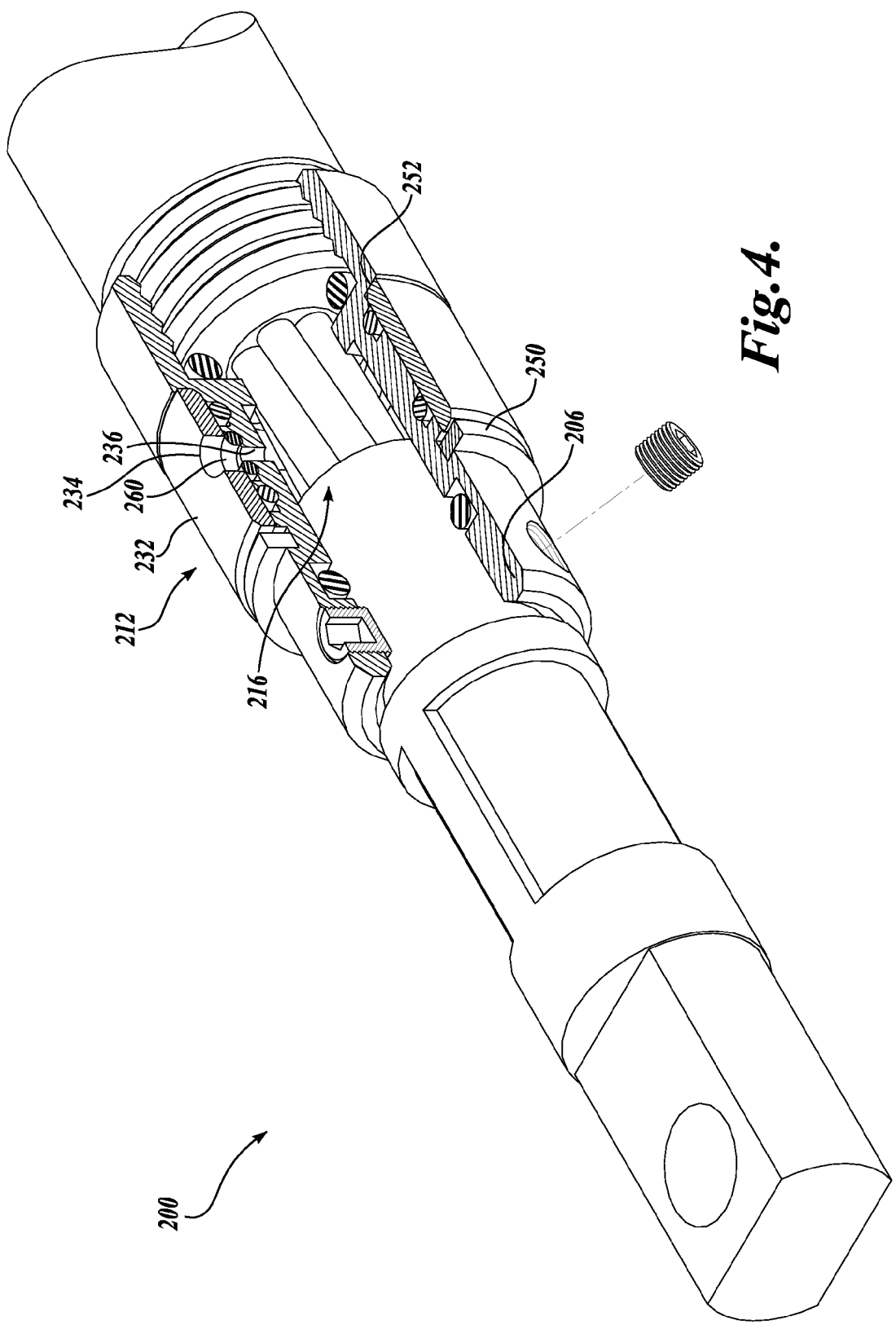
FIG. 4 is a perspective, partial cut-away view of an alternate embodiment of a cable connection assembly formed in accordance with the present invention, the cable connection assembly shown with a valve assembly of the cable connection assembly in an open position permitting fluid to enter the cable connection assembly through the valve assembly.
Figure 5:
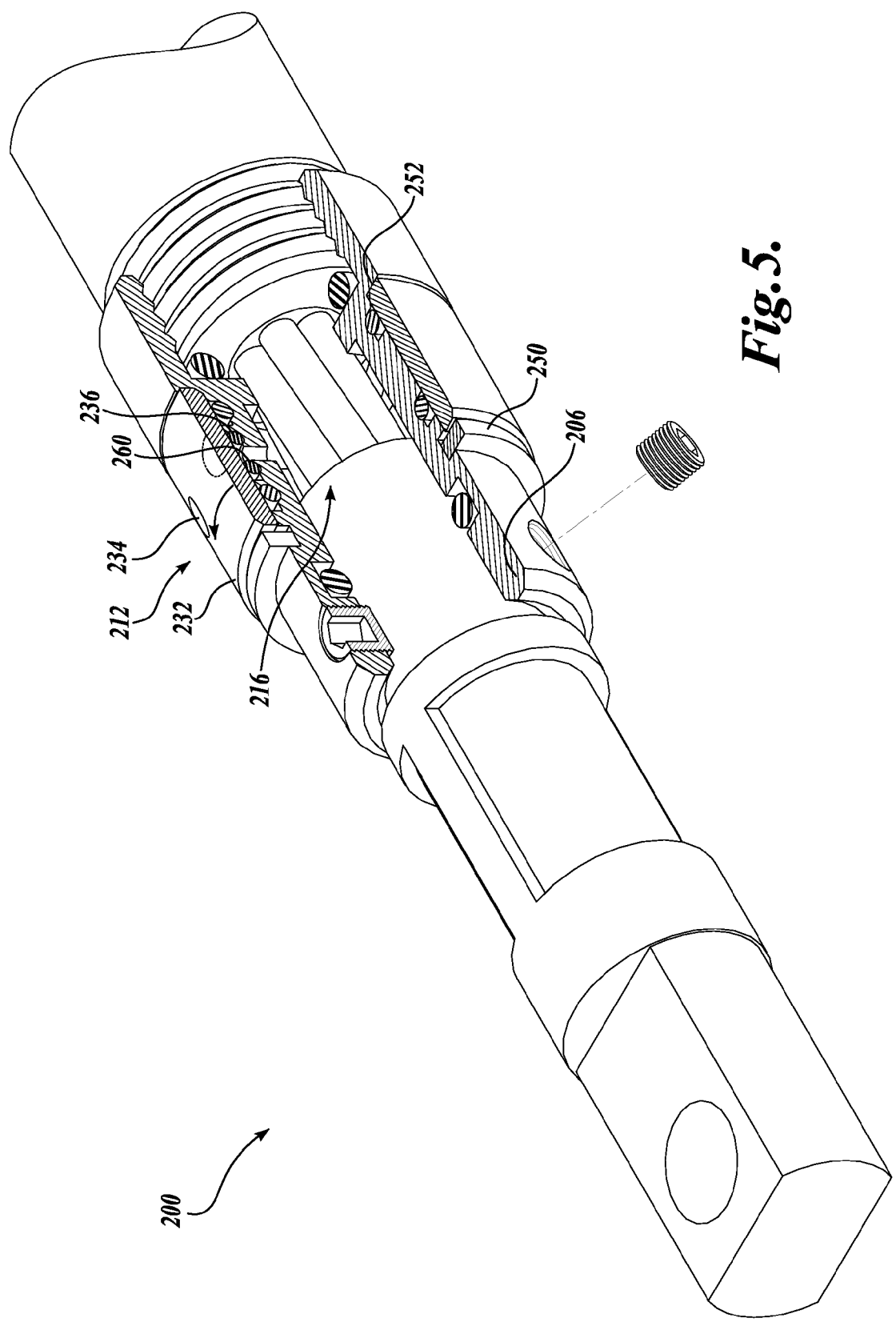
FIG. 5 is a perspective, partial cut-away view of the cable connection assembly of FIG. 4, the cable connection assembly illustrated with the valve assembly in a closed position blocking fluid from exiting the cable connection assembly through the valve assembly.

Referring to FIGS. 4 and 5, an alternate embodiment of a cable connection assembly 200 formed in accordance with the present invention is illustrated. The cable connection assembly 200 is substantially similar in construction and operation to the cable connection assembly 100 of FIGS. 1-3 described above. Therefore, for the sake of brevity, this detailed description will focus upon the aspects of the cable connection assembly 200 of FIGS. 4 and 5 which depart from the previously described embodiment, which is the construction and operation of the valve assembly.

The valve assembly 212 of this embodiment differs from the valve assembly of the previously described embodiment in that sealing member 232 is rotatable between the open position shown in FIG. 4 and the closed position shown in FIG. 5, rather than linearly moveable between the open and closed positions as shown and described for the previous embodiment.

Moreover, the valve assembly 212 is rotated into the open position by rotating the sealing member 232 about the longitudinal axis of the cable connection assembly 200 and about the outer surface of the main body 206. The sealing member 232 is in the open position when the injection port 234 of the sealing member 232 is aligned with one of the inlet ports 236 of the main body 206 as shown in FIG. 4. A seal 260 may be used to seal the inlet port 236 to the injection port 234.

The valve assembly 212 is rotated to the closed position by rotating the sealing member 232 about the longitudinal axis of the cable connection assembly 200 and about the outer surface of the main body 206. The sealing member 232 is in the closed position when the injection port 234 of the sealing member 232 is not aligned with any one of the inlet ports 236 of the main body 206 as shown in FIG. 5. The seal 260 seals against the sealing member 232, thereby forming the inner cavity 216 into a pressure vessel able to hold a fluid under pressure. The sealing member 232 is impeded from moving linearly along the length of the cable connection assembly 200 via the locking flange 252 and the locking member 250 disposed on each side of the sealing member.

Figure 6:
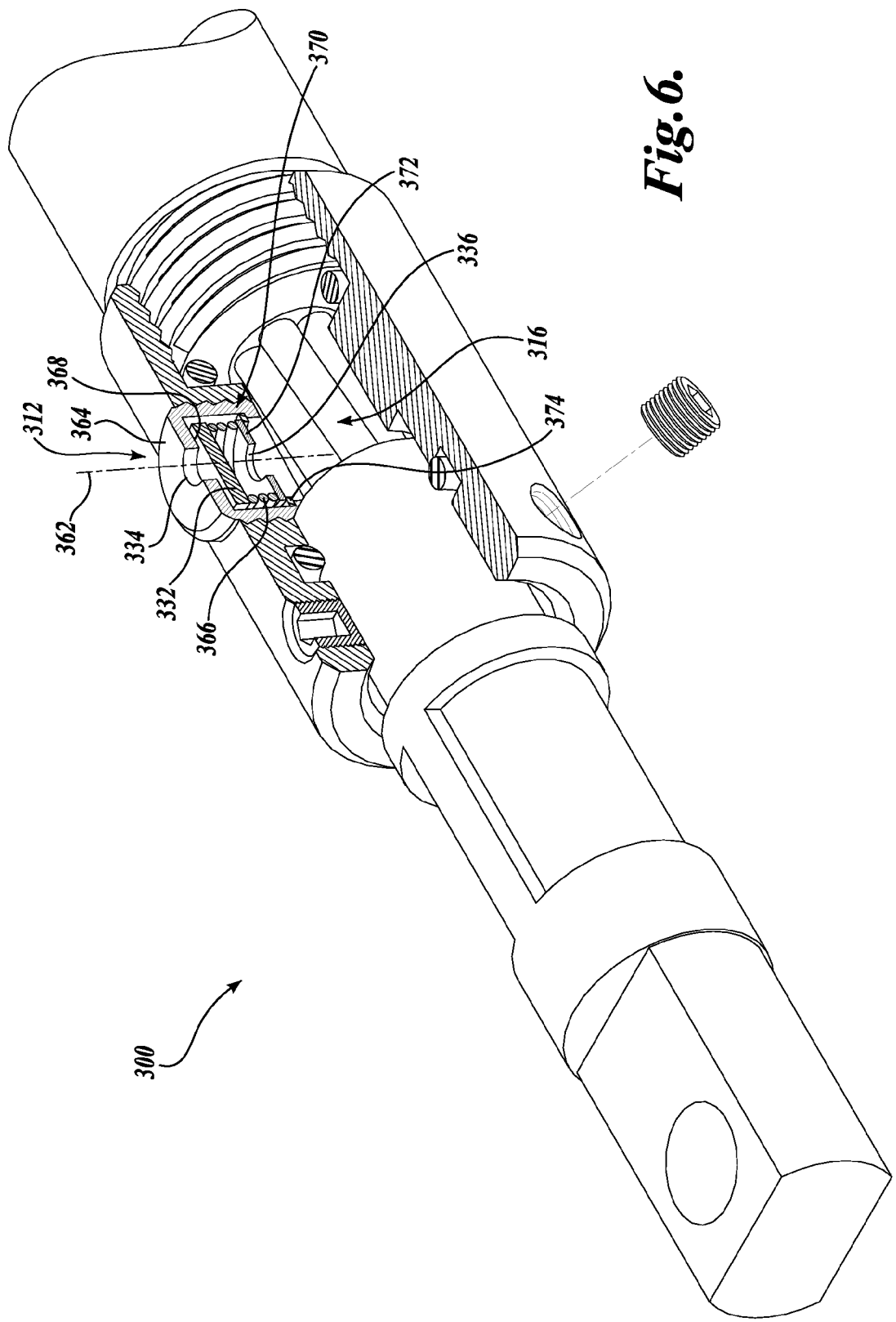
FIG. 6 is a perspective, partial cut-away view of still yet another embodiment of a cable connection assembly formed in accordance with the present invention, the cable connection assembly shown with a valve assembly of the cable connection assembly in an open position permitting fluid to enter the cable connection assembly through the valve assembly.
Figure 7:
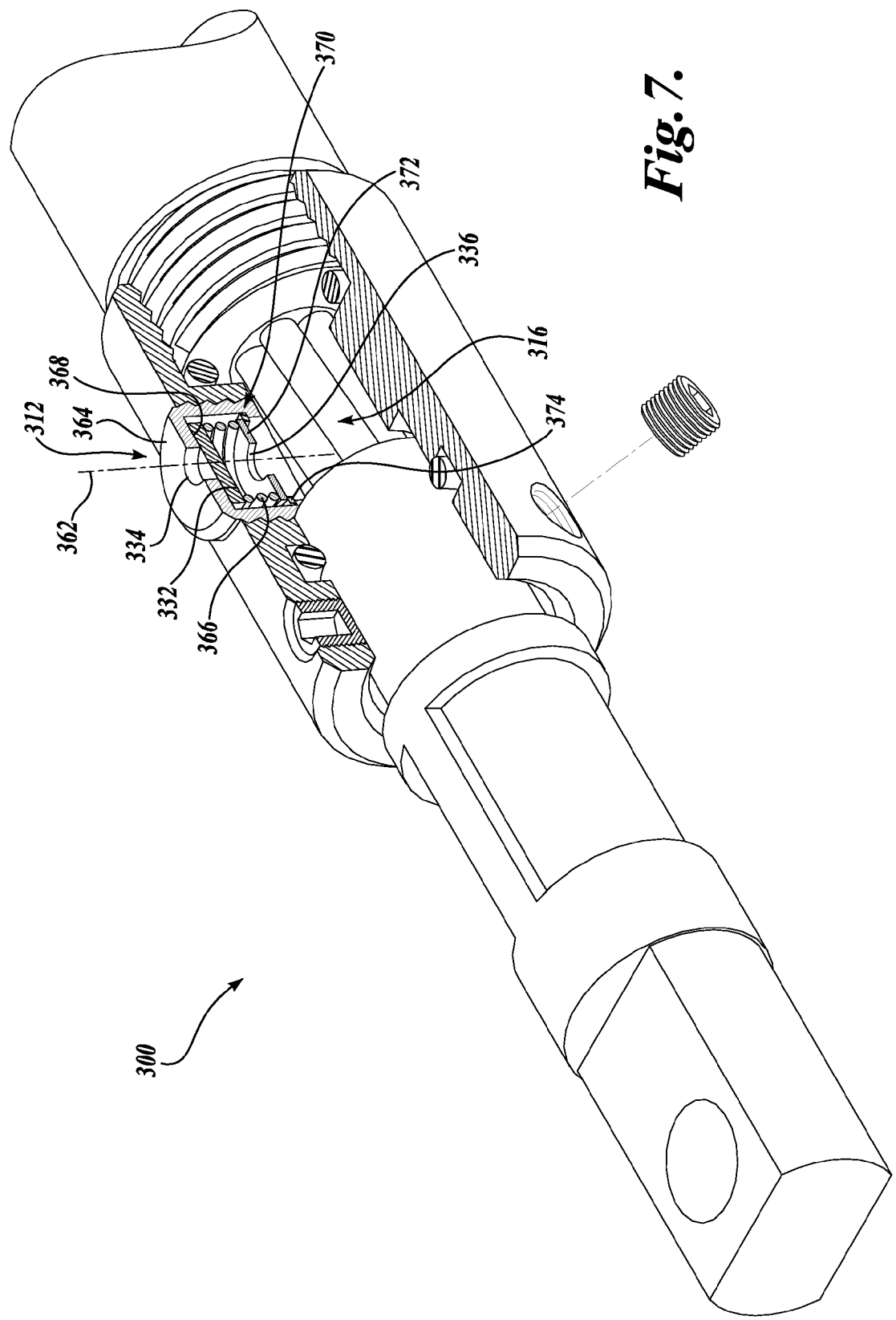
FIG. 7 is a perspective, partial cut-away view of the cable connection assembly of FIG. 6, the cable connection assembly illustrated with the valve assembly in a closed position blocking fluid from exiting the cable connection assembly through the valve assembly.

Referring to FIGS. 6 and 7, an alternate embodiment of a cable connection assembly 300 formed in accordance with the present invention is illustrated. The cable connection assembly 300 is substantially similar in construction and operation to the cable connection assembly 100 of FIGS. 1-3 described above. Therefore, for the sake of brevity, this detailed description will focus upon the aspects of the cable connection assembly 300 of FIGS. 6 and 7 which depart from the previously described embodiments, which is the construction and operation of the valve assembly.

The valve assembly 312 of this embodiment differs from the valve assembly of the previously described embodiment in that sealing member 332 is linearly moveable, preferably in a radial direction 362, between the open position shown in FIG. 6 and the closed position shown in FIG. 7, rather than linearly moveable in a longitudinal direction between the open and closed positions are shown and described for the embodiment of FIGS. 1-3.

Moreover, the valve assembly 312 is moved into the open position by linearly moving the sealing member 332 in the direction of a radial oriented axis 362 oriented perpendicular to the longitudinal axis of the cable connection assembly 300. More specifically, the valve assembly 312 of this embodiment may act as a check valve permitting flow into the inner cavity 316, unless held open. The valve assembly 312 may include a valve body 364, a biasing member 366, a valve seat 368, and a retaining assembly 370. The valve body 364 may house the sealing member 332, biasing member 366, and the retaining assembly 370.

The biasing member 366, which may be a valve spring, biases the sealing member 332 into sealing engagement with the valve seat 368, thereby sealing the injection port 334, preventing the entrance or exit of fluid into the inner cavity 316. The retaining assembly 370 retains the biasing member 366 in the valve body 364. The retaining assembly 370 includes a base plate 372 and a retaining clip 374. The base plate 372 is retained in the valve body 364 via the retaining clip 374 and supports/retains the biasing member 366 in the valve body 364.

When a fluid is injected in the injection port 334 and the pressure acting upon the sealing member 332 exceeds a predetermined value, the biasing force applied upon the sealing member 332 by the biasing member 366 is overcome. Once overcome, the sealing member 332 moves away from the valve seat 368, permitting the fluid to enter the fluid injection port 334, travel through the valve body 364, and out the inlet port 336 in the base plate 372 to enter the inner cavity 316 as shown in FIG. 6. When the fluid is no longer injected into the injection port 334, the biasing force applied by the biasing member 366 is no longer overcome, thereby resulting in the sealing member 332 moving linearly outward in a radial direction to sealingly engage the valve seat 368, thereby forming the inner cavity 316 into a pressure vessel able to hold a fluid under pressure as shown in FIG. 7. The sealing member 332 is impeded from moving from the closed position by the biasing member 366 until once again a fluid is injected through the injection port 334 and the biasing force of the biasing member 366 overcome.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cable connection assembly for coupling a cable to an apparatus, the cable connection assembly comprising:
   (a) a main body defining an inner cavity adapted to receive a pressurized fluid and receive at least a portion of the cable therein;
   (b) an attachment mechanism adapted to couple the main body to the cable;
   (c) a seal assembly adapted to sealingly couple the main body to the apparatus;
   (d) an inlet port passing through the main body for permitting the pressurized fluid to be injected into the inner cavity; and
   (e) a valve assembly coupled to the main body, the valve assembly having a sealing member moveable between a closed position in which the sealing member impedes fluid from flowing through the inlet port and an open position in which the sealing member permits fluid to flow through the inlet port for receipt by the cable, wherein the sealing member is adapted to be rotated between the closed position and the open position.

2. The cable connection assembly of claim 1, further comprising a fastening mechanism for coupling the main body to the apparatus.

3. The cable connection assembly of claim 1, wherein the seal assembly include a seal adapted to be sandwiched between the apparatus and the main body.

4. The cable connection assembly of claim 1, wherein the main body further includes a sealing surface, the sealing surface adapted to engage and sandwich a seal between the sealing surface and the cable to seal the main body to the cable.

5. The cable connection assembly of claim 1, further comprising a first annular seal and a second annular seal, the first and second annular seals adapted to circumferentially engage an inner surface of the sleeve on each side of the injection port.

6. The cable connection assembly of claim 1, wherein the attachment mechanism includes a threaded portion adapted to sealingly couple to a threaded portion of an insulation layer of the cable.

7. The cable connection assembly of claim 4, wherein the sealing surface is adapted to engage and sandwich a seal between the sealing surface and an end face of the cable to seal the main body to the cable.

8. A cable connection assembly for coupling a cable to an apparatus, the cable connection assembly comprising:
   (a) a main body defining an inner cavity adapted to receive a pressurized fluid and receive at least a portion of the cable therein;
   (b) a threaded portion disposed on a first end of the main body for coupling the main body to the cable;
   (c) a seal disposed on the second end of the main body for sealing the main body to the apparatus;
   (d) an inlet port passing through the main body for permitting the pressurized fluid to be injected into the inner cavity of the main body; and
   (e) a fastening mechanism disposed on a second end of the main body for coupling the main body to the apparatus;
   (f) a valve assembly coupled to the main body, the valve assembly having a sealing member moveable between a closed position in which the sealing member impedes fluid from flowing through the inlet port and an open position in which the sealing member permits fluid to flow through the inlet port for receipt by the cable, wherein the sealing member is adapted to be rotated between the closed position and the open position.

9. The cable connection assembly of claim 8, further comprising an annular shaped recess disposed on an inner surface of the main body, the annular shaped recess sized and shaped to receive the seal therein.

10. The cable connection assembly of claim 8, further comprising a valve assembly interfaced with the inlet port, the valve assembly configurable between a closed position impeding fluid flow through the inlet port and an open position permitting fluid flow through the inlet port.

11. The cable connection assembly of claim 8, wherein the threaded portion is comprised of internal threads disposed upon an inner surface of the main body.

12. The cable connection assembly of claim 8, wherein the main body further includes a sealing surface, the sealing surface adapted to engage a seal to sandwich the seal between the sealing surface and the cable to seal the main body to the cable.

13. The cable connection assembly of claim 8, wherein the sealing member is a sleeve having an injection port, wherein when the sealing member is in the closed position, the injection port is not in fluid communication with the inlet port, and wherein when the sealing member is in the open position, the injection port is in fluid communication with the inlet port.

14. The cable connection assembly of claim 13, further comprising a first annular seal and a second annular seal, the first and second annular seals adapted to circumferentially engage an inner surface of the sleeve on each side of the injection port.

15. The cable connection assembly of claim 13, further comprising a seal disposed between the main body and the sealing member, the seal surrounding the inlet port and the injection port.

16. The cable connection assembly of claim 8, wherein the seal assembly includes a seal adapted to be sandwiched between the apparatus and the main body.

17. A cable connection assembly for coupling a cable to an apparatus, the cable connection assembly comprising:

(a) a main body defining an inner cavity adapted to receive a pressurized fluid and receive at least a portion of the cable therein, wherein the main body further includes a sealing surface, the sealing surface adapted to engage a first seal to sandwich the first seal between the sealing surface and an end face of the cable to seal the main body to the cable;

(b) an attachment mechanism adapted to couple the main body to the cable;

(c) a second seal disposed on the second end of the main body for sealing the main body to the apparatus; and (d) a fastening mechanism disposed on a second end of the main body for coupling the main body to the apparatus.

18. The cable connection assembly of claim 17, further comprising an annular shaped recessed disposed on an inner surface of the main body, the annular shaped recess sized and shaped to receive the second seal therein.

* * * * *

UNITED STATES PATENT AND TRADEMARK OFFICE
CERTIFICATE OF CORRECTION

PATENT NO. : 7,658,629 B2  Page 1 of 1
APPLICATION NO. : 12/050069
DATED : February 9, 2010
INVENTOR(S) : W. R. Stagi et al.

It is certified that error appears in the above-identified patent and that said Letters Patent is hereby corrected as shown below:

| COLUMN | LINE | ERROR |
|---|---|---|
| 8 (Claim 8, | 52 line 14) | after "apparatus;" insert --and-- |
| 10 (Claim 18, | 21 line 2) | "recessed" should read --recess-- |

Signed and Sealed this

Thirteenth Day of July, 2010

David J. Kappos
*Director of the United States Patent and Trademark Office*